(12) United States Patent
Kraus et al.

(10) Patent No.: US 10,479,388 B2
(45) Date of Patent: Nov. 19, 2019

(54) SHOPPING CART AND ASSOCIATED SYSTEMS AND METHODS

(71) Applicant: Walmart Apollo, LLC, Bentonville, AR (US)

(72) Inventors: Larry A. Kraus, Bella Vista, AR (US); Anthony G. Wind, III, Gravette, AR (US); Lawrence J. Duerkes, Springdale, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 345 days.

(21) Appl. No.: 15/426,569

(22) Filed: Feb. 7, 2017

(65) Prior Publication Data
US 2017/0225701 A1 Aug. 10, 2017

Related U.S. Application Data

(60) Provisional application No. 62/292,495, filed on Feb. 8, 2016.

(51) Int. Cl.
*B62B 5/04* (2006.01)
*B60R 16/03* (2006.01)
(Continued)

(52) U.S. Cl.
CPC ........ *B62B 5/0423* (2013.01); *B60R 16/0307* (2013.01); *B62B 3/14* (2013.01);
(Continued)

(58) Field of Classification Search
CPC ....... B62B 5/0423; B62B 3/14; B62B 5/0457; B62B 5/06; B60R 16/0307;
(Continued)

(56) References Cited

U.S. PATENT DOCUMENTS 5,194,844 A * 3/1993 Zelda ................... B62B 5/0423
180/167
5,357,182 A * 10/1994 Wolfe ................... B62B 5/0423
188/1.12
(Continued)

FOREIGN PATENT DOCUMENTS

| EP | 2106986 A1 | 10/2009 |
| WO | 2010036952 A2 | 4/2010 |
| WO | 2015149149 A1 | 10/2015 |

OTHER PUBLICATIONS

Shopping Cart Containment System, User Manual: Gatekeeper Systems, http://www.gatekeepersystems.com/pdf/GS2UserManual.pdf, published 2007.
(Continued)

*Primary Examiner* — Calvin Cheung
(74) *Attorney, Agent, or Firm* — McCarter & English, LLP; David R. Burns

(57) ABSTRACT

Exemplary embodiments are generally directed to shopping carts and associated systems and methods. Exemplary embodiments of the shopping cart include a shopping cart body and a plurality of wheels supporting the shopping cart body. Exemplary embodiments of the shopping cart include a receiver configured to detect a position of the shopping cart relative to a range of a network or an area defined by a geo-fence. Exemplary embodiments of the shopping cart include an electromagnetic generator operatively coupled to at least one of the plurality of wheels. A resistive load can be selectively connected between an input and an output of the electromagnetic generator to restrict rotation of the at least one of the plurality of wheels as the position of the shopping cart detected by the receiver varies between within or outside of the range of the network or the area defined by the geo-fence.

20 Claims, 7 Drawing Sheets

(51) Int. Cl.
*B62B 3/14* (2006.01)
*B62B 5/06* (2006.01)
*H04W 4/021* (2018.01)
*H04W 84/12* (2009.01)
*B60R 25/10* (2013.01)

(52) U.S. Cl.
CPC .............. *B62B 5/0457* (2013.01); *B62B 5/06* (2013.01); *H04W 4/021* (2013.01); *B60R 25/1012* (2013.01); *B60Y 2200/86* (2013.01); *B60Y 2300/60* (2013.01); *B60Y 2400/112* (2013.01); *B60Y 2400/308* (2013.01); *H04W 84/12* (2013.01)

(58) Field of Classification Search
CPC .. B60R 25/1012; H04W 4/021; H04W 84/12; B60Y 2200/86; B60Y 2300/60; B60Y 2400/112; B60Y 2400/308
See application file for complete search history.

(56) References Cited

U.S. PATENT DOCUMENTS

| | | | |
|---|---|---|---|
| 5,432,412 A | 7/1995 | Harris et al. | |
| 7,647,248 B2 | 1/2010 | Bell et al. | |
| 7,870,916 B2 | 1/2011 | Carter | |
| 7,944,354 B2 | 5/2011 | Kangas et al. | |
| 8,570,171 B2 | 10/2013 | Hannah et al. | |
| 2003/0102969 A1* | 6/2003 | Parsons | B62B 3/1404 340/539.13 |
| 2006/0103530 A1* | 5/2006 | Prather | A47F 9/045 340/568.5 |
| 2007/0045018 A1 | 3/2007 | Carter et al. | |
| 2008/0074260 A1* | 3/2008 | Reiner | B60R 25/09 340/568.5 |
| 2008/0122227 A1* | 5/2008 | Hammerle | B60R 25/00 290/1 R |
| 2008/0158013 A1* | 7/2008 | Nebolon | B62B 5/0423 340/988 |
| 2008/0309389 A1 | 12/2008 | French et al. | |
| 2009/0120736 A1 | 5/2009 | Masterson et al. | |
| 2009/0140850 A1 | 6/2009 | Kangas et al. | |
| 2013/0187755 A1* | 7/2013 | Rogers | G06Q 30/06 340/5.61 |
| 2013/0249177 A1 | 9/2013 | Hannah et al. | |
| 2013/0255335 A1 | 10/2013 | Jonely | |
| 2014/0167960 A1 | 6/2014 | Argue et al. | |
| 2015/0239290 A1* | 8/2015 | McKay | B60T 1/04 16/35 R |

OTHER PUBLICATIONS

International Search Report and Written Opinion based on related PCT international patent application No. PCT/US2017/016846 dated Apr. 13, 2017.

* cited by examiner

SHOPPING CART AND ASSOCIATED SYSTEMS AND METHODS

CROSS-REFERENCE TO RELATED APPLICATIONS

This application claims the benefit of, commonly assigned U.S. Provisional Patent Application No. 62/292,495, which was filed on Feb. 8, 2016. The entire content of the foregoing provisional patent application is incorporated herein by reference.

BACKGROUND

Retail establishments generally provide shopping carts to customers for shopping within the retail establishment and transporting the purchased items/products to the customer's vehicle. However, there is a continual loss of shopping carts from retail establishments due to theft of the shopping carts by customers for personal use. Overhead costs of the retail establishment thereby increase to maintain a certain number of shopping carts available to customers.

In addition, while shopping within the retail establishment or while transferring purchased products from the shopping cart into the customer's vehicle, the shopping cart can be left unattended and can roll on its own, striking surrounding structures (e.g., shelves, the customer's vehicle, surrounding vehicles, or the like) and/or people, causing damage to the surrounding structures. Overhead costs of the retail establishment to repair the damaged structures of the retail establishment thereby increase. Similarly, customer costs for repairing a damaged vehicle and/or medical costs may be necessary.

SUMMARY

Exemplary embodiments of the present disclosure overcome the disadvantages of conventional shopping carts by providing for a shopping cart with a locking mechanism for restricting rotation of the wheels of the shopping cart to prevent theft of the shopping cart from the retail establishment, and further prevent an unattended shopping cart from rolling and striking surrounding structures and/or people. The locking mechanism associated with the shopping cart reduces overhead costs for retail establishments and prevents the need for customer costs for repairing a damaged vehicle and/or medical costs due to damage caused by the shopping cart.

In accordance with embodiments of the present disclosure, an exemplary shopping cart is provided that includes a shopping cart body and wheels (e.g., three, four, or the like) supporting the shopping cart body. The shopping cart can include an electromagnetic generator (e.g., a locking mechanism) operatively coupled to at least one of the wheels. A resistive load can be selectively connected between an input and an output of the electromagnetic generator to selectively restrict rotation of the at least one of the wheels.

In some embodiments, the resistive load can be selectively connected between the input and the output of the electromagnetic generator by a normally closed electronic switch to form a closed circuit. The at least one of the wheels can freely rotate in response to opening the normally closed switch. In some embodiments, each wheel of the shopping cart can be associated with an electromagnetic generator and each electromagnetic generator can be associated with a switch and a resistive load. In some embodiments, only one wheel of the shopping cart can be associated with an electromagnetic generator and the electromagnetic generator can be associated with a switch and a resistive load.

In some embodiments, the shopping cart can include at least one of a Wi-Fi receiver or a global positioning system (GPS) receiver. The Wi-Fi receiver can be configured to detect a position of the shopping cart relative to a range of a Wi-Fi network. The GPS receiver can be configured to detect a position of the shopping cart relative to an area defined by a geo-fence. The switch can be opened when the Wi-Fi receiver detects the position of the shopping cart as within the range of the Wi-Fi network and/or when the GPS receiver detects the position of the shopping cart as within the area defined by the geo-fence, thereby allowing free rotation of the at least one of the wheels. The switch can be closed when the Wi-Fi receiver detects the position of the shopping cart as outside of the range of the Wi-Fi network and/or when the GPS receiver detects the position of the shopping cart as outside of the area defined by the geo-fence, to restrict rotation of the at least one of the wheels.

In some embodiments, the shopping cart can include one or more sensors configured to detect a presence or proximity of a customer relative to the shopping cart. The sensor(s) can include at least one of a mechanical sensor (e.g., a pressure sensor or switch), a capacitive switch, an acoustic sensor, an optical sensor, a photosensor, or the like. For embodiments including a mechanical sensor, the mechanical sensor can detect pressure imparted against a handle of the shopping cart body.

In some embodiments, the switch between the input and output of the electromagnetic generator can be opened when the presence or proximity of the customer is detected to be within a predetermined distance relative to the shopping cart by the sensor(s), allowing the at least one of the plurality of wheels to rotate freely. For embodiments including an electromagnetic generator, a resistive load, and a switch for each wheel, each switch can be opened based on the output of the sensor(s). The switch/switches can be closed when the proximity of the customer is detected to be outside of the predetermined distance relative to the shopping cart by the sensor, to restrict rotation of the wheel(s).

The shopping cart can include a power source and a controller operatively coupled to the power source. The controller can be configured to selectively connect the resistive load(s) between the input and the output of the electromagnetic generator(s). Upon depletion of the power source beyond a threshold level, the controller can cease to operate and the resistive load(s) can remain connected between the input and the output of the electromagnetic generator(s) to restrict rotation of the wheel(s).

In accordance with embodiments of the present disclosure, an exemplary method of securing a shopping cart is provided. The method includes providing the shopping cart. The shopping cart includes a shopping cart body, wheels supporting the shopping cart body, and an electromagnetic generator operatively coupled to at least one of the wheels. The method includes controlling a switch to selectively connect and disconnect a resistive load between an input and an output of the electromagnetic generator. Rotation of the at least one of the wheels can be restricted in response to controlling the switch to connect the resistive load between the input and the output of the electromagnetic generator. The at least one of the wheels can be configured to freely rotate in response to controlling the switch to disconnect the resistive load from one of the input or the output of the electromagnetic generator.

In some embodiments, the method can include detecting a position of the shopping cart relative to a range of a Wi-Fi network with a Wi-Fi receiver. In some embodiments, the method can include detecting a position of the shopping cart relative to an area defined by a geo-fence with a GPS receiver. The switch can be controlled to disconnect the resistive load from the input or the output of the electromagnetic generator when the Wi-Fi receiver detects the position of the shopping cart to be within the range of the Wi-Fi network. Similarly, the switch can be controlled to disconnect the resistive load from the input or the output of the electromagnetic generator when the GPS receiver detects the position of the shopping cart to be outside of the area defined by the geo-fence.

In some embodiments, the method can include detecting a proximity of a user relative to the shopping cart with a sensor. The switch can be controlled to disconnect the resistive load from the input or the output of the electromagnetic generator when the sensor detects the proximity of the customer within a predetermined distance relative to the shopping cart.

In accordance with embodiments of the present disclosure, an exemplary shopping cart security system is provided that includes a Wi-Fi signal source and/or a GPS signal source, and a shopping cart. The shopping cart can include a shopping cart body, wheels supporting the shopping cart body, and an electromagnetic generator operatively coupled to at least one of the wheels. The shopping cart can include at least one of a Wi-Fi receiver or a GPS receiver configured to receive signals from the Wi-Fi signal source or the GPS signal source, respectively. The shopping cart security system can include a resistive load selectively connected between an input and an output of the electromagnetic generator to restrict rotation of the at least one of the wheels and selectively disconnected from the input or the output of the electromagnetic generator to allow the at least one of the wheels to rotate freely.

The resistive load can be disconnected from the input or output of the electromagnetic generator when the Wi-Fi receiver detects the Wi-Fi signal source and/or when the GPS receiver detects a position of the shopping cart to be within an area defined by a geo-fence of the GPS signal source. The resistive load can be connected between the input and the output of the electromagnetic generator when the Wi-Fi receiver fails to detect the Wi-Fi signal source and/or when the GPS receiver detects a position of the shopping cart to be outside an area defined by the geo-fence of the GPS signal source. In some embodiments, the shopping cart security system can include a sensor configured to detect a proximity of a customer relative to the shopping cart.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed shopping cart and associated systems and methods, reference is made to the accompanying figures, wherein.

DETAILED DESCRIPTION

Exemplary embodiments of the present disclosure overcome the disadvantages of conventional shopping carts by providing for a shopping cart with a locking mechanism for engaging the wheels of the shopping cart to prevent theft of the shopping cart from the retail establishment, and further prevent an unattended shopping cart from rolling and striking surrounding structures and/or people. The locking mechanism associated with the shopping cart reduces overhead costs for retail establishments and prevents the need for customer costs for repairing a damaged vehicle and/or medical costs due to damage caused by the shopping cart.

Figure 1:
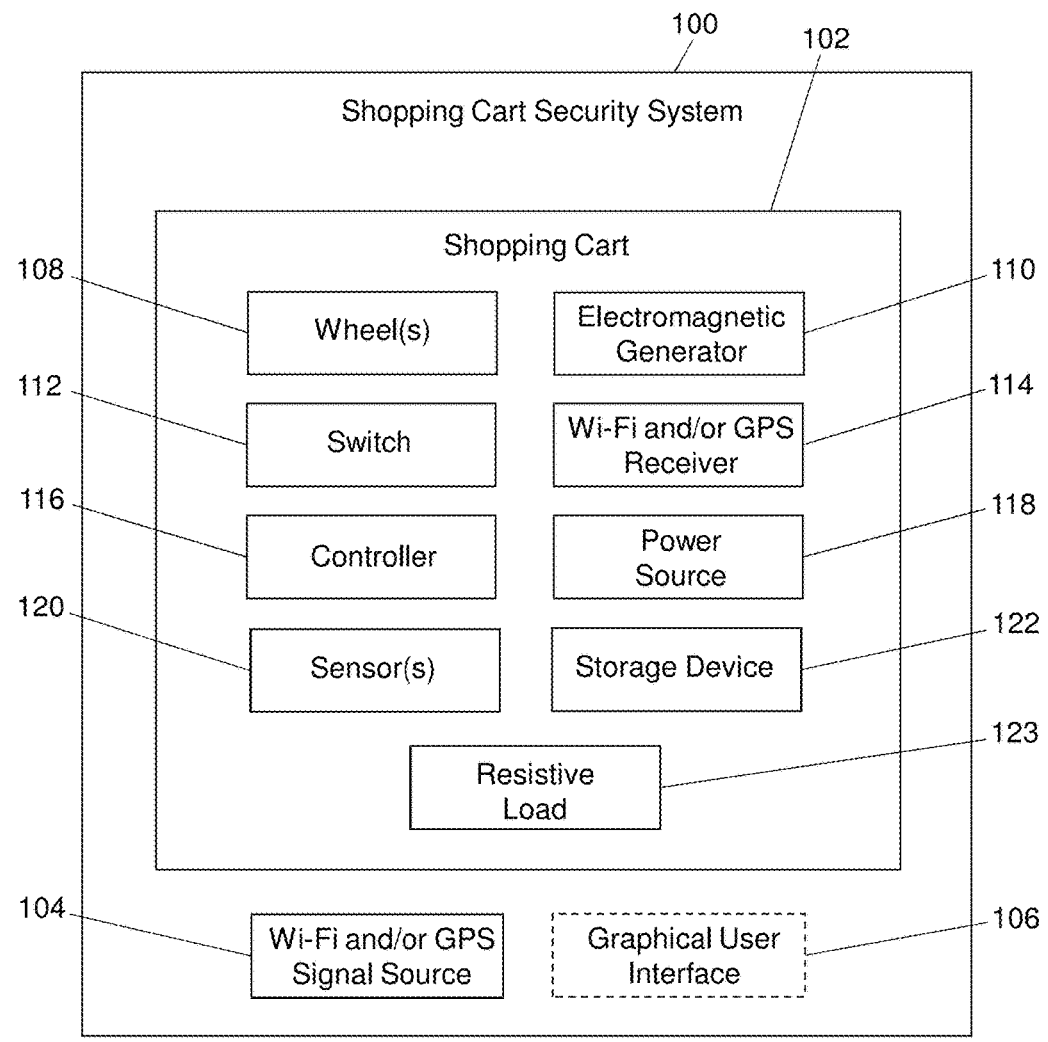
FIG. 1 is a block diagram of an exemplary shopping cart security system in accordance with exemplary embodiments of the present disclosure.

FIG. 1 is a block diagram of a shopping cart security system 100 (hereinafter "system 100") in accordance with embodiments of the present disclosure. The system 100 can be used to provide security for retail environments to prevent shopping cart theft from the retail environment or areas surrounding the retail environment. The system 100 also provides security in maintaining unattended shopping carts from rolling and striking surrounding structures. The system 100 includes one or more shopping carts 102 and a signal source 104 (e.g., a Wi-Fi signal source, a global positioning system signal source, combinations thereof, or the like). The shopping cart 102 can be configured to be driven manually by a user. In some embodiments, the system 100 can include a user interface device 106 that can provide a graphical user interface (GUI) to allow a user to interact with circuitry of the shopping cart 102 and/or the signal source 104. For example, the GUI can be used to programmatically input signal conditions of the signal source (e.g., a range of the Wi-Fi signal, a range of the GPS signal, an area defined by a geo-fence, combinations thereof, or the like), input a predetermined distance for sensing a presence or proximity of a user relative to the shopping cart 102, combinations thereof, or the like. In some embodiments, the GUI can be in the form of application software programmatically stored and operated on the user interface device 106. In some embodiments, the user interface device 106 can includes an electronic device, such as a portable electronic device (e.g., a tablet, a mobile phone, a handheld mobile device, a wearable electronic device), a personal computer, a server, combinations thereof, or the like.

Each shopping cart 102 can include wheels 108 (e.g., three, four, or the like) supporting a body of the shopping cart 102 thereon. The wheels 108 can be rotatably coupled to the shopping cart 102. In exemplary embodiments, the body of the shopping cart 102 can include a frame and a basket. The shopping cart 102 includes one or more electromagnetic generators 110 and a switch 112. At least one of the wheels can be operatively coupled to the one or more electromagnetic generators 110. The electromagnetic generators 110 can be rotatably coupled to the frame of the shopping cart 102. For example, in exemplary embodiments, each of the wheels 108 can be operatively coupled to one of the one or more electromagnetic generators 110 and/or multiple wheels 108 can be operatively to one of the one or more electromagnetic generators 110. As will be discussed in greater detail below, one or more resistive loads 123 can be selectively connected between an input and an output of the one or more electromagnetic generators 110 to restrict rotation of the wheels 108 operatively coupled to the one or more electromagnetic generators 110. In some embodiments, one or more of the wheels 108 can be individually coupled to a respective electromagnetic generator 110, a switch 112 and a resistive load 123. In some embodiments, one or more pairs of wheels 108 can be coupled as a pair to a respective electromagnetic generator 110, a switch 112 and a resistive load 123. In some embodiments, all of the wheels 108 can be coupled to a single electromagnetic generator 110, a switch 112 and a resistive load 123.

In some embodiments, the shopping cart 102 can include a receiver 114 (e.g., a Wi-Fi receiver, a GPS receiver, combinations thereof, or the like) configured to receive/detect signals output by the signal source 104. For example, the Wi-Fi receiver 114 can be configured to detect a position of the shopping cart 102 relative to a range of a Wi-Fi network based on signals emitted by the Wi-Fi signal source 104. As a further example, the GPS receiver 114 can be configured to detect a position of the shopping cart 102 relative to an area defined by a geo-fence as defined by signals emitted by the GPS signal source 104.

The shopping cart 102 can include a controller 116 and a power source 118. The controller 116 can be operatively coupled to the power source 118, and can be configured to selectively connect and disconnect the one or more resistive loads between the input(s) and the output(s) of the one or more electromagnetic generators 110. For example, the controller 116 can connect the resistive load between the input and the output of one of the one or more electromagnetic generator 110 by closing the switch 112 when the Wi-Fi receiver 114 detects the position of the shopping cart 102 as outside of the range of the Wi-Fi network and/or when the GPS receiver 114 detects the position of the shopping cart 102 as outside of the area defined by the geo-fence. Connecting the resistive load and closing the switch 112 can restrict rotation of the one or more wheels 108 associated with the electromagnetic generator 110. As a further example, the controller 116 can disconnect the resistive load between the input and the output of the electromagnetic generator 110 by opening the switch 112 when the Wi-Fi receiver 114 detects the position of the shopping cart 102 as within the range of the Wi-Fi network and/or when the GPS receiver 114 detects the position of the shopping cart 102 as within the area defined by the geo-fence. Disconnecting the resistive load and opening the switch 112 allows the one or more wheels 108 associated with the electromagnetic generator 110 to rotate freely. Thus, based on a position of the shopping cart 102 relative to the retail establishment, the wheels 108 of the shopping cart 102 can be allowed to freely rotate or rotation can be restricted to inhibit removal of the shopping cart 102 beyond an area surrounding the retail establishment.

In some embodiments, the power source 118 can be, e.g., a battery, a capacitor, a solar panel disposed on the shopping cart 102, the one or more electromagnetic generators 110 (generating electricity based on rotation of at least one of the wheels), combinations thereof, or the like. For example, the solar panel, the electromagnetic generator 110, or both, can generate electricity and the battery or capacitor can be used as the power source 118 to retain a charge to power the circuitry of the shopping cart.

In some embodiments, the shopping cart 102 can include a sensor 120 (e.g., a mechanical sensor, a capacitive sensor, an acoustic sensor, an optical sensor, combinations thereof, or the like). The sensor 120 can be used to detect a presence or proximity of the user to the shopping cart 102. For example, the mechanical sensor can be a pressure sensor or mechanical switch disposed within a handle of the shopping cart 102 and can detect pressure imparted against the handle when the user grasps the handle. The controller 116 can disconnect the resistive load from the electromagnetic generator 110 to open the switch 112 when the presence or proximity of the user is detected by the sensor 120. For embodiments that include non-contact sensors, such as capacitive sensors, acoustic sensors, and/or optical sensors, the controller 116 can open the switch 112 when the presence or proximity of the user is determined to be within a predetermined distance relative to the shopping cart 102. The controller 116 can connect the resistive load to the electromagnetic generator 110 to close the switch 112 when the presence or proximity of the user is detected by the sensor 120 to be outside of the predetermined distance relative to the shopping cart 102. In some embodiments, the shopping cart 102 can include one or more storage devices 122 (e.g., memory) configured to store instructions, such as firmware and/or software for controlling the switch 112 and/or data, such as the predetermined distance to be detected by the sensor 120, the range of the Wi-Fi signal source 104, the geo-fence area defined by the GPS signal source 104, combinations thereof, or the like.

Figure 2:
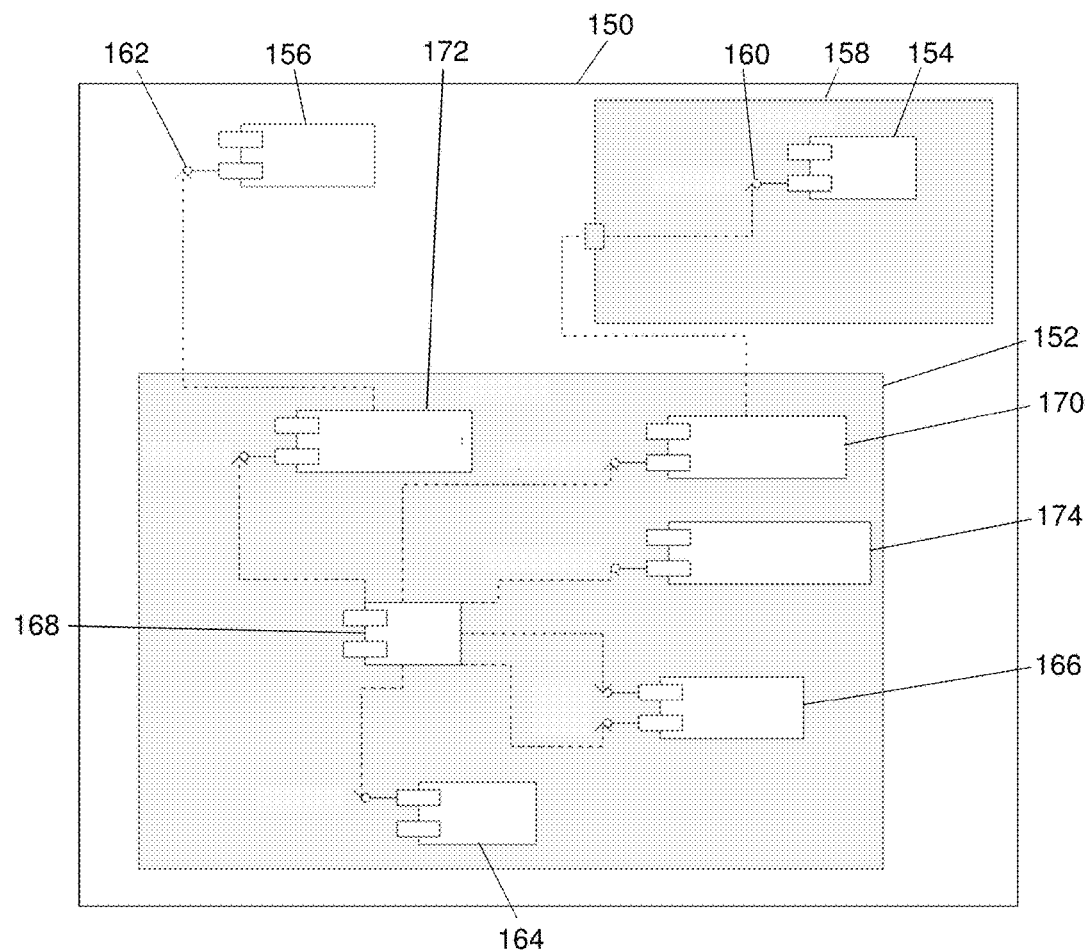
FIG. 2 is a block diagram of an exemplary shopping cart security system in accordance with exemplary embodiments of the present disclosure.

FIG. 2 is a block diagram of a shopping cart security system 150 (hereinafter "system 150") in accordance with embodiments of the present disclosure. The system 150 can be substantially similar in structure and function to the system 100, except for the distinctions noted herein. The system 150 generally includes one or more shopping carts 152, the shopping cart 152 including a shopping cart body supported by a plurality of wheels. The system 150 can include a Wi-Fi signal source 154, a GPS signal or data source 156, or both. In some embodiments, the Wi-Fi signal source 154 can be disposed within a retail environment (e.g., a store system 158). The Wi-Fi signal source 154 can be configured to transmit a Wi-Fi signal 160 to establish a Wi-Fi network with a predetermined range relative to the store system 158. For example, the Wi-Fi network range can extend throughout the retail establishment and a surrounding parking lot associated with the retail establishment. For example, Wi-Fi signal source 154 can include one or more Wi-Fi transceivers (e.g., Wi-Fi access points) distributed throughout a retail establishment and the surrounding parking lot associated with the retail establishment. The GPS signal or data source 156 (e.g., a GPS satellite) can be configured to transmit a GPS signal 162, the GPS signal 162 can be processed by the GPS receiver to establish an area defined by a geo-fence relative to the store system 158. For example, the area defined by the geo-fence can extend throughout the retail establishment and the surrounding parking lot associated with the retail establishment.

At least one of the wheels of the shopping cart 152 can include a brake 164. The shopping cart 152 can include one or more data storage devices 166 (e.g., electronic memory or the like) and a controller 168. In some embodiments, the shopping cart 152 can include a Wi-Fi receiver 170, a GPS receiver 172, or both. In some embodiments, the shopping cart 152 can include one or more sensors 174 configured to detect the proximity or presence of the user relative to the shopping cart 152. The data storage device(s) 166 can be communicatively connected (e.g., through wired means, wireless means, combinations thereof, or the like) to the controller 168 such that instructions for operating the controller 168 can be input by a user into the data storage device(s) 166 through the user interface device. The controller 168 can be communicatively connected to the brake 164 such that based on the instructions stored in the data storage device(s) 166, the controller 168 can activate and deactivate the brake 164, thereby regulating the ability of the wheels of the shopping cart 152 to freely rotate.

The controller 168 can be communicatively connected to the Wi-Fi receiver 170, the GPS receiver 172, and/or the sensor 174. The Wi-Fi receiver 170 can be configured to receive Wi-Fi signals 160 transmitted by the Wi-Fi signal source 154. If a Wi-Fi signal 160 is detected by the Wi-Fi receiver 170, such detection can be communicated to the controller 168 as indicating that the shopping cart 152 is within the range of the Wi-Fi network. If a Wi-Fi signal 160 is not detected by the Wi-Fi receiver 170, such lack of detection can be communicated to the controller 168 as indicating that the shopping cart 152 is outside the range of the Wi-Fi network. If the shopping cart 152 is within the range of the Wi-Fi network, the controller 168 can disconnect the resistive load between the input and the output of the electromagnetic generator (e.g., the brake 164) by opening the switch associated with the electromagnetic generator, allowing the wheels of the shopping cart 152 to rotate freely. If the shopping cart 152 is outside the range of the Wi-Fi network, the controller 168 can connect the resistive load between the input and the output of the electromagnetic generator by closing the switch associated with the electromagnetic generator, generating a closed-loop feedback path from the output to the input of the electromagnetic generator through the resistive load to restrict rotation of one or more wheels of the shopping cart 152. Restricting rotation of one or more wheels of the shopping cart 152 when the shopping cart 152 is outside the range of the Wi-Fi network can inhibit theft of shopping carts 152 from the retail establishment.

The GPS receiver 172 can be configured to receive GPS signals 162 transmitted by the GPS signal source 156. If a GPS signal 162 is detected by the GPS receiver 172, such detection can be communicated to the controller 168 as indicating that the shopping cart 152 is within the area defined by the geo-fence. If a GPS signal 162 is not detected by the GPS receiver 172 or the GPS receiver 172 detects that the location coordinates of the shopping cart 152 are outside the area defined by the geo-fence, such detection can be communicated to the controller 168. If the shopping cart 152 is within the area defined by the geo-fence, the controller 168 can disconnect the resistive load between the input and the output of the electromagnetic generator (e.g., the brake 164) by opening the switch associated with the electromagnetic generator, allowing the wheels of the shopping cart 152 to rotate freely. If the shopping cart 152 is outside the area defined by the geo-fence, the controller 168 can connect the resistive load between the input and the output of the electromagnetic generator by closing the switch associated with the electromagnetic generator, generating a closed-loop feedback path from the output to the input of the electromagnetic generator through the resistive load to restrict rotation of one or more wheels of the shopping cart 152. Restricting rotation of one or more wheels of the shopping cart 152 when the shopping cart 152 is outside the area defined by the geo-fence can inhibit theft of shopping carts 152 from the retail establishment.

The sensor 174 can be configured to detect the proximity or presence of the customer (or any other user) relative to the shopping cart 152. In some embodiments, a mechanical sensor can be incorporated into the handle of the shopping cart 152 such that pressure imparted on the handle when the customer grasps the handle can be detected. If the sensor 174 detects a predetermined or preset pressure against the handle of the shopping cart 152, the controller 168 can disconnect the resistive load between the input and the output of the electromagnetic generator (e.g., the brake 164) by opening the switch associated with the electromagnetic generator, thereby electrically isolating the feedback path from the input of the electromagnetic generator, which allows the wheels of the shopping cart 152 to rotate freely. The controller 168 can control an operation of the switch substantially simultaneously to the mechanical sensor sensing the predetermined or preset pressure against the handle such that substantially no delay occurs between the customer grasping the handle of the shopping cart 152 and unrestricted rolling of the wheels. If the sensor 174 does not detect a predetermined or preset pressure against the handle of the shopping cart 152, the controller 168 can connect the resistive load between the input and the output of the electromagnetic generator by closing the switch associated with the electromagnetic generator, generating a closed-loop feedback path from the output to the input of the electromagnetic generator through the resistive load to restrict rotation of the one or more wheels of the shopping cart 152. Restricting rotation of one or more wheels of the shopping cart 152 when the there is no pressure imparted on the handle of the shopping cart 152 can prevent unattended shopping carts 152 from rolling and striking surrounding structures.

In some embodiments, a capacitive sensor can be implemented to detect the proximity or presence of the customer (or any other user) relative to the shopping cart 152. In particular, the capacitive sensor can function by detecting changes in capacitance of the shopping cart 152. When the customer touches any metal portion of the shopping cart 152, the body capacitance of the customer increases the capacitance of the shopping cart 152 and triggers the controller 168 to open the switch. Opening the switch involves disconnecting the resistive load between the input and the output of the electromagnetic generator (e.g., the brake 164), thereby electrically isolating the feedback path from the input of the electromagnetic generator, which allows the wheels of the shopping cart 152 to rotate freely. The controller 168 can control an operation of the switch substantially similarly to the sensor 174 sensing the presence or proximity of the customer relative to the shopping cart 152 such that substantially no delay occurs between the customer touching or approaching the shopping cart 152 and unrestricted rolling of the wheels. When the customer releases the shopping cart 152, the capacitance of the shopping cart 152 decreases and the controller 168 can connect the resistive load between the input and the output of the electromagnetic generator by closing the switch associated with the electromagnetic generator, generating a closed-loop feedback path from the output to the input of the electromagnetic generator through the resistive load to restriction rotation of the one or more wheels of the shopping cart 152. Restricting rotation of one or more wheels of the shopping cart 152 when the presence or proximity of the customer is not detected relative to a predetermined distance from the shopping cart 152 can prevent unattended shopping carts 152 from rolling and striking surrounding structures.

Figure 3:
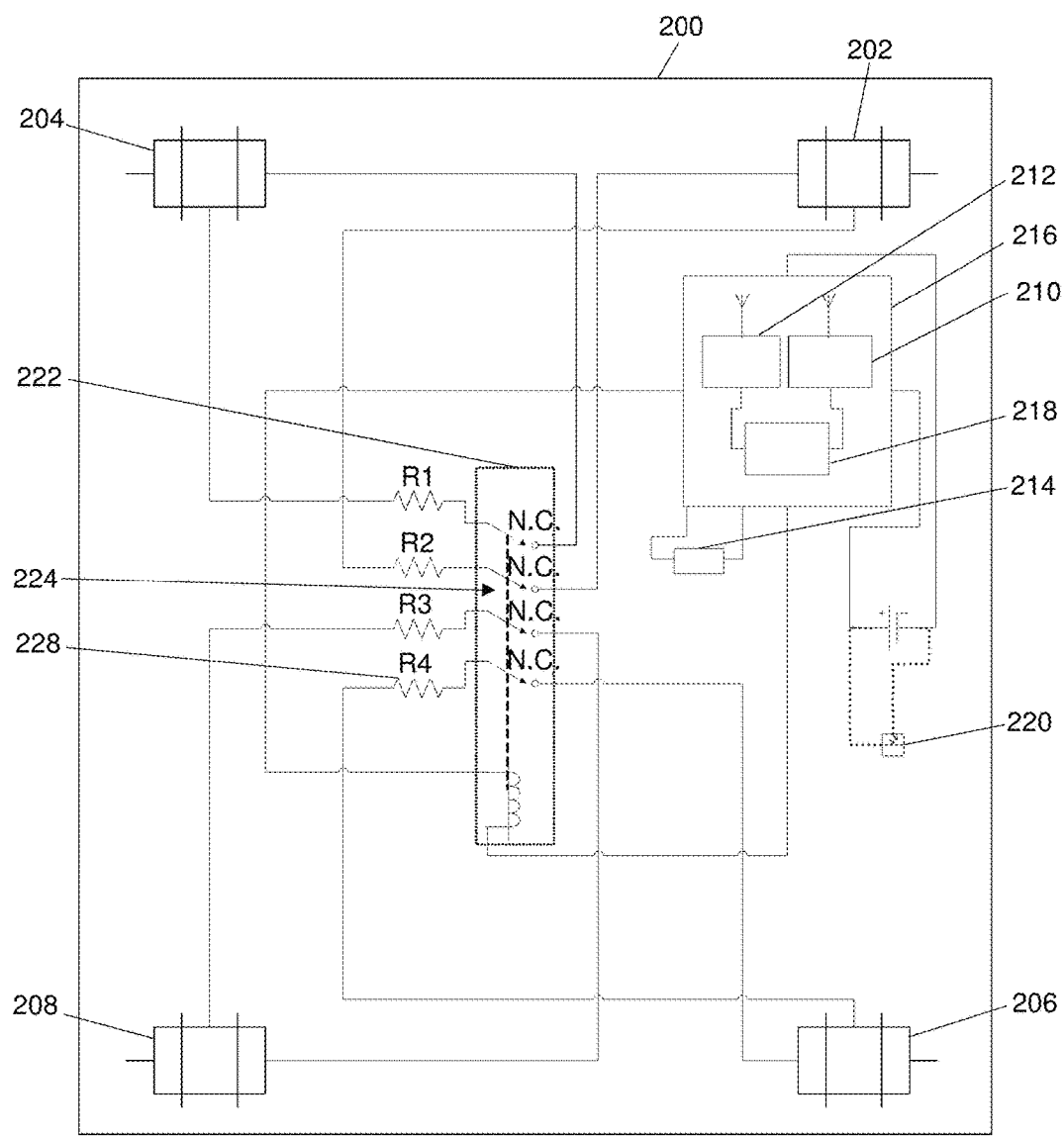
FIG. 3 is a block diagram of an exemplary shopping cart in accordance with exemplary embodiments of the present disclosure.

FIG. 3 is a block diagram of an exemplary shopping cart 200 in accordance with embodiments of the present disclosure. In particular, FIG. 3 shows circuitry of the shopping cart 200. As noted above, the shopping cart 200 includes a plurality of wheels assemblies (e.g., a right front wheel assembly 202, a left front wheel assembly 204, a right rear wheel assembly 206, and a left rear wheel assembly 208). Although illustrated with four wheel assemblies, it should be understood that the shopping cart 200 can include any number of wheel assemblies. The shopping cart 200 can include a Wi-Fi receiver 210 (e.g., a Wi-Fi detector module), a GPS receiver 212 (e.g., a GPS location module), a sensor 214 (e.g., a customer proximity or presence sensor), combinations thereof, or the like. In some embodiments, the circuitry associated with the Wi-Fi receiver 210, the GPS receiver 212, and the sensor 214 can be disposed within the controller 216. In some embodiments, the controller 216 can include a processing device 218 configured to programmatically regulate operation of the Wi-Fi receiver 210, the GPS receiver 212, and the sensor 214, and one or more switches 224. In some embodiments, the shopping cart 200 can include a power source 220 (e.g., a solar panel, a battery, a capacitor, or the like) configured to provide power to the controller 216 and to power the Wi-Fi receiver 210, the GPS receiver 212, the sensor 214, the processing device 218, combinations thereof, or the like.

The shopping cart 200 can include a normally closed relay 222 for regulating opening and closure of one or more switches 224. In particular, the default position of the relay 222 can be closed (i.e. the one or more switches 224 can be normally closed switches) to restrict rotation of the wheels 202-208, unless the proper signals are detected by the receiver(s) (e.g., indicating the shopping cart 200 is within a range or boundary of the Wi-Fi and/or GPS signal source) and//or the sensor 214 (e.g., indicating a user is outside of a predetermined distance relative to the shopping cart 200). While a relay 222 is shown as an illustrative switching device that can be utilized, exemplary embodiments of the present disclosure can utilize any suitable switching device, such as transistors, triacs, or the like. Circuitry can connect each of the wheel assemblies 202-208, the Wi-Fi receiver 210 and/or the GPS receiver 212, the controller 216, the relay 222, and/or the switches 224 relative to each other. In some embodiments, circuitry can connect each of the wheel assemblies 202-208, the sensor 214, and/or the controller 216 relative to each other. Although shown as connecting each of the wheels 202-208, it should be understood that one or more of the wheel assemblies 202-208 can be operatively connected via the circuitry with the Wi-Fi receiver 210 and/or the GPS receiver 212, the controller 216, the relay 222, and the one or more switches 224 while permitting the exemplary security system to work as described.

As noted above, based on signals received by the Wi-Fi receiver 210 and/or the GPS receiver 212, the one or more switches 224 can be opened or closed by connecting or disconnecting the resistive load 228 between the input and the output of the electromagnetic generator. In some embodiments, the resistive load 228 can have a resistance of approximately five hundred milli-ohms to approximately one hundred ohms. In some embodiments, the resistive load can have a resistance of less than approximately five hundred milli-ohms or greater than approximately one hundred ohms Use of a low impedance resistors (e.g., less than one hundred ohms) across the electromagnetic generators results in a heavy mechanical load imparted on the electromagnetic generators when an attempt to move the shopping cart is made. Thus, application of the resistive load results in the electromagnetic generators resisting itself and, in turn, restricting rotation of the wheels of the wheel assemblies 202-208. Each of the electromagnetic generators can include a fixed coil with a rotating magnet (or vice-versa fixed magnet with a rotating coil). Rotating of the magnet with respect to the fixed coil creates a varying magnetic field that induces an electrical current in the coil. If the switch 224 is closed, the resistive load 228 is connected to the circuit and the electrical current is feedback to the electromagnetic generator through the resistive load such that the electromagnetic generator resists itself, resulting in a force that restricts rotation of one or more wheels of the wheel assemblies 202-208. If the switch 225 is opened, the resistive load 228 is disconnected from the circuit and the electrical current is not feedback to the electromagnetic generator, thereby allowing free rotation of the one or more wheel assemblies 202-208. The switch 224 can remain in a normally closed position to restriction rotation of the wheel assemblies 202-208, and upon detection by the Wi-Fi receiver 210 that the shopping cart 200 is within range of the Wi-Fi network and/or detection by the GPS receiver 212 that the shopping cart 200 is within an area defined by a geo-fence, the switch 224 can be opened to allow rotation of the wheel assemblies 202-208.

As also noted above, based on detection of the proximity or presence of the customer relative to the shopping cart 200 by the sensor 214, the switch associated with the sensor 214 can be opened or closed by connecting or disconnecting a resistive load 228 between the input and the output of the electromagnetic generator. The switch can remain in a normally open position to allow rotation of the wheel assemblies 202-208. Upon detection by the sensor 214 that the proximity or presence of the customer is beyond a predetermined distance relative to the shopping cart 200, the switch can be closed to prevent rotation of the wheel assemblies 202-208.

Figure 4:
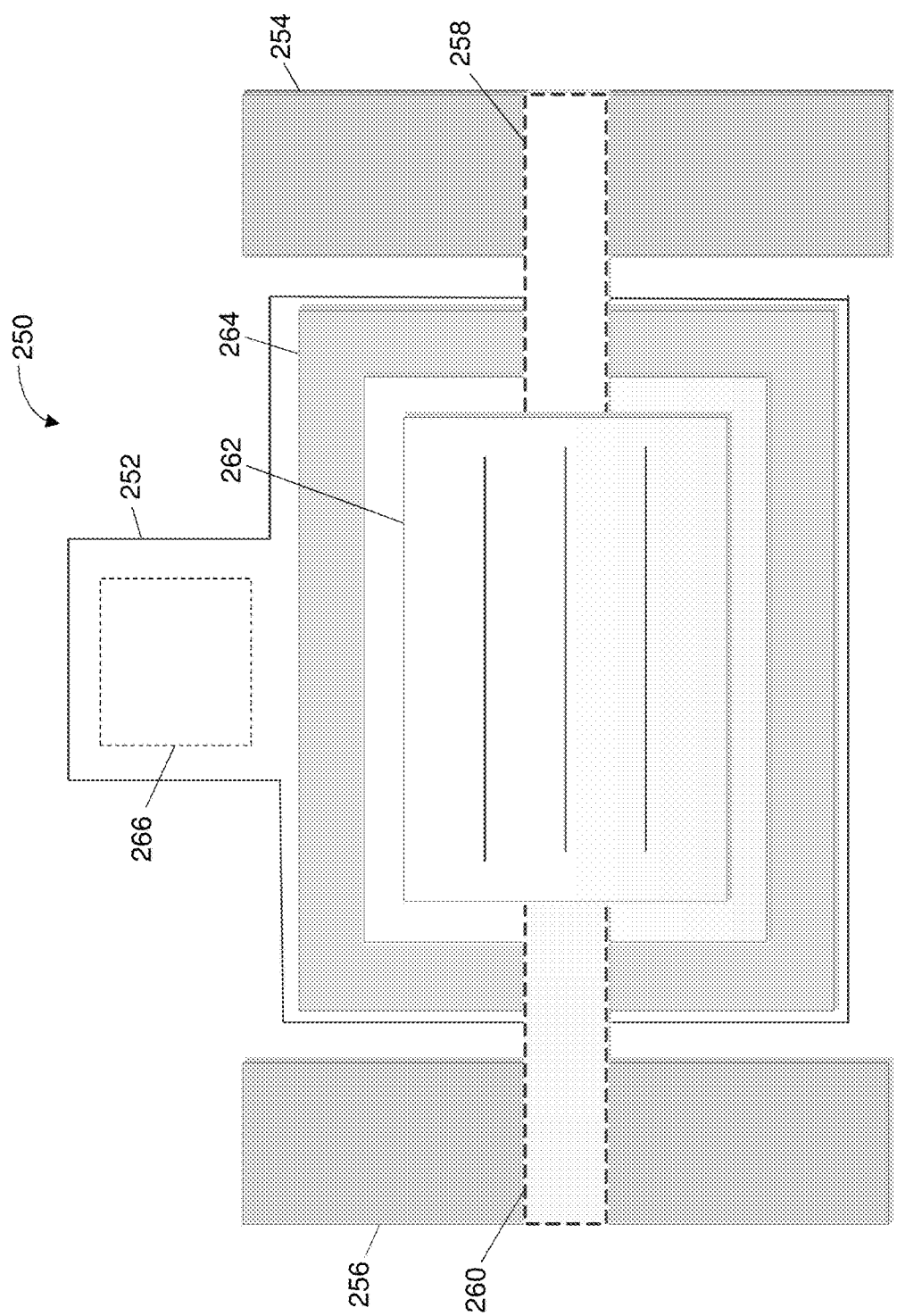
FIG. 4 is a block diagram of an exemplary wheel assembly of a shopping cart in accordance with exemplary embodiments of the present disclosure.

FIG. 4 is a block diagram of an exemplary wheel assembly 250 of the shopping cart discussed herein. Although illustrating a single wheel assembly 250, it should be understood that one or more wheels of the shopping cart discussed herein can include the wheel assembly 250. The wheel assembly 250 generally includes a housing 252 (e.g., a caster wheel housing, or the like) and one or more wheels 254, 256 disposed on opposing sides of the housing 252. The housing 252 can be attached to the bottom of the shopping cart body such that the wheel assembly 250 supports the shopping cart body for movement along a surface. Each of the wheels 254, 256 can be rotatably connected to the housing via an axle or shaft 258, 260.

The shaft 258, 260 can connect to one or more magnets 262 disposed within the housing 252 such that rotation of the shaft 258, 260 simultaneously rotates the magnets 262. The housing 252 includes a fixed coil 264 disposed within the housing 252 and positioned around the magnets 262. The rotating magnets 262 and the fixed coil 264 form the electromagnetic generator of the exemplary shopping cart, and rotating the magnets 262 relative to the fixed coil 264 induces electrical current. Although shows as having a fixed coil 264 and rotating magnets 262, in some embodiments, the wheel assembly 250 can include a fixed magnet and a rotating coil. In some embodiments, the housing 252 can include one or more components 266 for regulating the electromagnetic generator, such as the controller, the Wi-Fi receiver, the GPS receiver, the sensor, or the like. In some embodiments, one or more of the components 266 can be incorporated into other portions of the shopping cart body. Circuitry can connect the components 266 with the wheel assembly 250. The housing 252 can provide security against tampering with components of the wheel assembly 250, and further provides protection against the elements, such as rain and snow.

Figure 5:
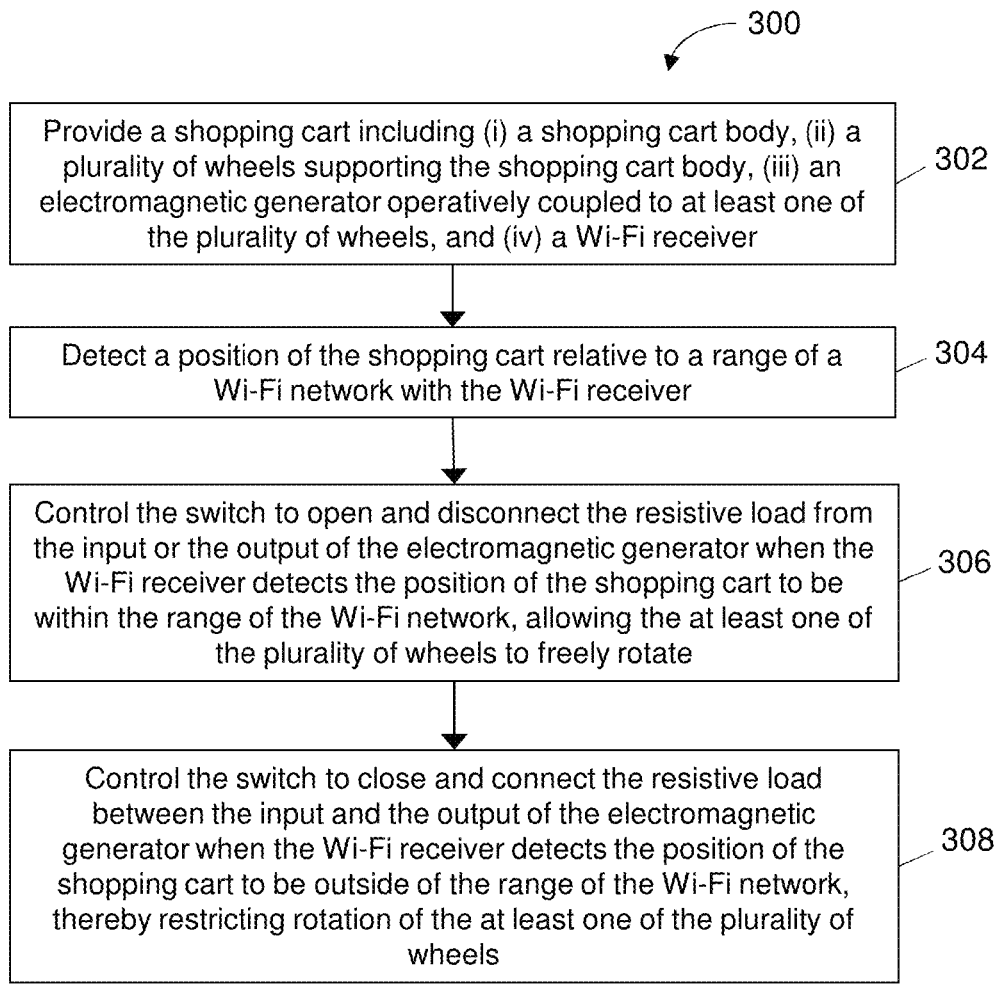
FIG. 5 is a flowchart illustrating an implementation of an exemplary shopping cart security system in accordance with embodiments of the present disclosure.

FIG. 5 is a flowchart illustrating an exemplary process 300 as implemented by the shopping cart security system including a Wi-Fi receiver. To begin, at step 302, a shopping cart can be provided that includes a shopping cart body, a plurality of wheels supporting the shopping cart body, an electromagnetic generator operatively coupled to at least one of the plurality of wheels, and a Wi-Fi receiver. At step 304, a position of the shopping cart relative to a range of a Wi-Fi network can be detected with a Wi-Fi receiver. At step 306, the switch can be controlled to open and disconnect the resistive load from the input or the output of the electromagnetic generator when the Wi-Fi receiver detects the position of the shopping cart to be within the range of the Wi-Fi network, allowing the wheels of the shopping cart to freely rotate. At step 308, the switch can be controlled to close and connect the resistive load between the input and the output of the electromagnetic generator when the Wi-Fi receiver detects the position of the shopping cart to be outside of the range of the Wi-Fi network, thereby restricting rotation of at least one of the plurality of wheels. Thus, removal of the shopping cart beyond the range of the Wi-Fi network representing the retail environment and the surrounding parking lot can be prevented.

Figure 6:
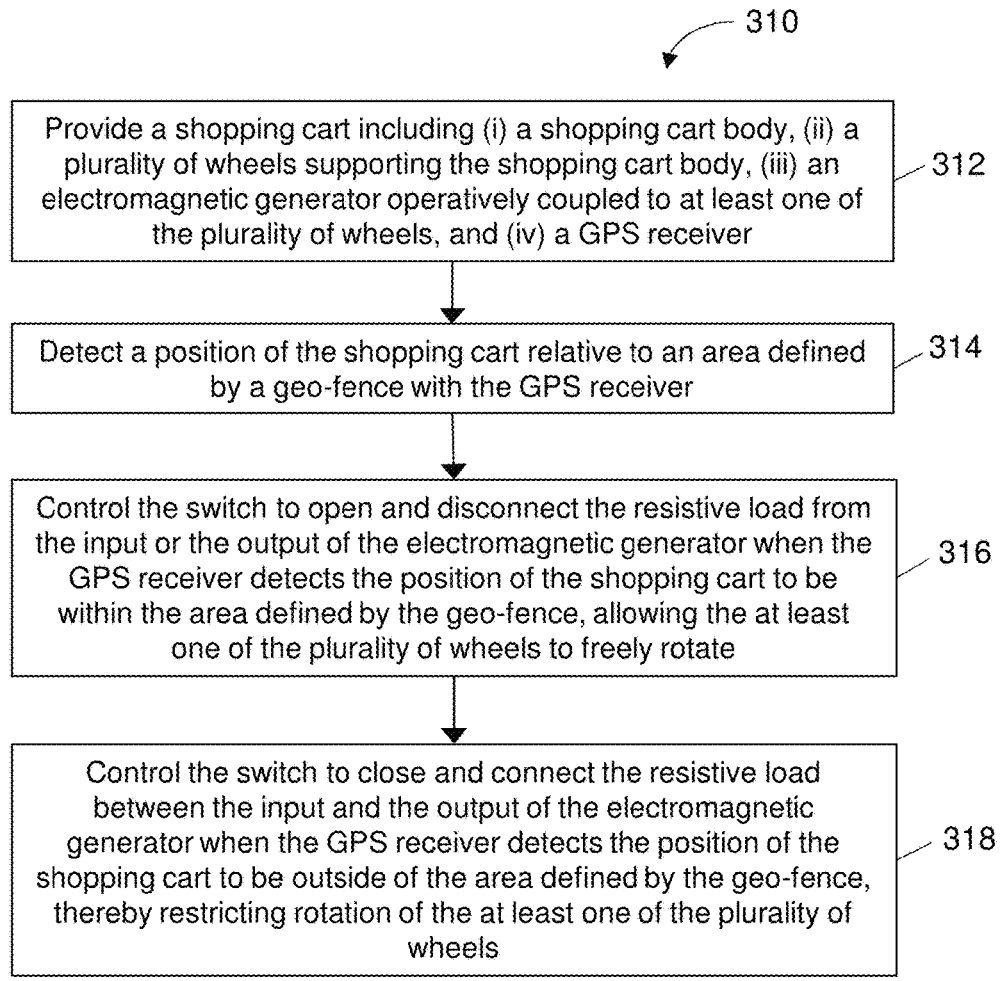
FIG. 6 is a flowchart illustrating an implementation of an exemplary shopping cart security system in accordance with embodiments of the present disclosure.

FIG. 6 is a flowchart illustrating an exemplary process 310 as implemented by the shopping cart security system including a GPS receiver. To begin, at step 312, a shopping cart can be provided that includes a shopping cart body, a plurality of wheels supporting the shopping cart body, an electromagnetic generator operatively coupled to at least one of the plurality of wheels, and a GPS receiver. At step 314, a position of the shopping cart relative to an area defined by a geo-fence can be detected with the GPS receiver. At step 316, the switch can be controlled to open and disconnect the resistive load from the input or the output of the electromagnetic generator when the GPS receiver detects the position of the shopping cart to be within the area defined by the geo-fence, allowing the wheels of the shopping cart to freely rotate. At step 318, the switch can be controlled to close and connect the resistive load between the input and the output of the electromagnetic generator when the GPS receiver detects the position of the shopping cart to be outside of the area defined by the geo-fence, thereby restricting rotation of at least one of the plurality of wheels. Thus, removal of the shopping cart beyond the area of the geo-fence representing the retail environment and the surrounding parking lot can be prevented.

Figure 7:
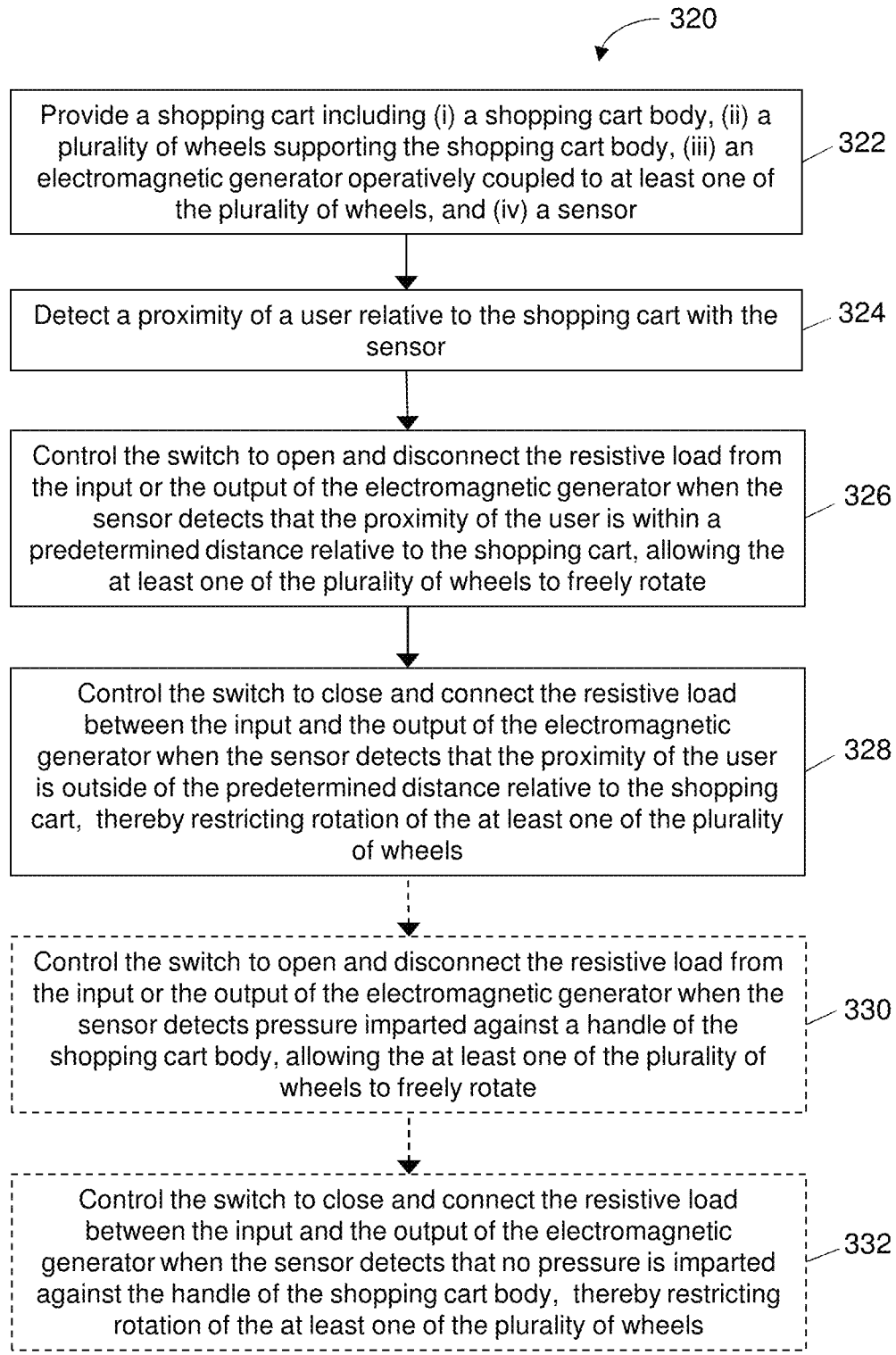
FIG. 7 is a flowchart illustrating an implementation of an exemplary shopping cart security system in accordance with embodiments of the present disclosure.

FIG. 7 is a flowchart illustrating an exemplary process 320 as implemented by the shopping cart security system including a customer proximity or presence sensor. To begin, at step 322, a shopping cart can be provided that includes a shopping cart body, a plurality of wheels supporting the shopping cart body, an electromagnetic generator operatively coupled to at least one of the plurality of wheels, and a sensor. At step 324, a presence or proximity of a user relative to the shopping cart can be detected with the sensor. At step 326, the switch can be controlled to open and disconnect the resistive load from the input or the output of the electromagnetic generator when the sensor detects that the presence or proximity of the user is within a predetermined distance relative to the shopping cart, allowing the wheels of the shopping cart to freely rotate. At step 328, the switch can be controlled to close and connect the resistive load between the input and the output of the electromagnetic generator when the sensor detects that the presence or proximity of the user is outside of the predetermined distance relative to the shopping cart, thereby restricting rotation of at least one of the plurality of wheels. Thus, rolling of unattended carts can be prevented.

In some embodiments, at step 330, the switch can be controlled to open and disconnect the resistive load from the input or the output of the electromagnetic generator when the sensor detects a predetermined amount of pressure imparted against a handle of the shopping cart body, allowing the wheels of the shopping cart to freely rotate. In some embodiments, at step 332, the switch can be controlled to close and connect the resistive load between the input and the output of the electromagnetic generator when the sensor detects that the predetermined amount of pressure is not imparted against the handle of the shopping cart body, thereby restricting rotation of at least one of the plurality of wheels. Thus, rolling of unattended carts can be prevented. Although FIGS. 5-7 illustrate the processes as separate, it should be understood that the exemplary embodiments can include a Wi-Fi receiver, a GPS receiver, a sensor, or combinations thereof, such that the components function together to prevent theft of shopping carts and rolling of unattended shopping carts.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A shopping cart, comprising:
a shopping cart body;
a plurality of wheels supporting the shopping cart body;
a Wi-Fi receiver configured to detect a position of the shopping cart relative to a range of a network; and
an electromagnetic generator operatively coupled to at least one of the plurality of wheels, wherein a resistive load is selectively connected between an input and an output of the electromagnetic generator to restrict rotation of the at least one of the plurality of wheels as the position of the shopping cart detected by the Wi-Fi receiver varies between within the range of the network and outside of the range of the network.

2. The shopping cart of claim 1, wherein the resistive load is selectively connected between the input and the output of the electromagnetic generator by a normally closed switch to form a closed circuit.

3. The shopping cart of claim 2, wherein the at least one of the plurality of wheels freely rotates in response to opening the normally closed switch.

4. The shopping cart of claim 3, comprising a global positioning system receiver.

5. The shopping cart of claim 4, wherein the global positioning system receiver is configured to detect the position of the shopping cart relative to an area defined by a geo-fence.

6. The shopping cart of claim 5, wherein the switch is open when the Wi-Fi receiver detects the position of the shopping cart as within the range of the Wi-Fi network or when the global positioning system receiver detects the position of the shopping cart as within the area defined by the geo-fence.

7. The shopping cart of claim 5, wherein the switch is closed when the Wi-Fi receiver detects the position of the shopping cart as outside of the range of the Wi-Fi network or when the global positioning system receiver detects the position of the shopping cart as outside of the area defined by the geo-fence to restrict rotation of the at least one of the plurality of wheels.

8. The shopping cart of claim 3, comprising a sensor configured to detect a proximity of a customer relative to the shopping cart.

9. The shopping cart of claim 8, wherein the sensor comprises at least one of a mechanical switch, a capacitive switch, or an optical sensor.

10. The shopping cart of claim 9, wherein the mechanical switch detects pressure imparted against a handle of the shopping cart body.

11. The shopping cart of claim 8, wherein the switch is open when the proximity of the customer is detected to be within a predetermined distance relative to the shopping cart by the sensor, allowing the at least one of the plurality of wheels to rotate freely.

12. The shopping cart of claim 8, wherein the switch is closed when the proximity of the customer is detected to be outside of a predetermined distance relative to the shopping cart by the sensor, restricting rotation of the at least one of the plurality of wheels.

13. The shopping cart of claim 1, further comprising:
a power source; and
a controller operatively coupled to the power source;
wherein the controller is configured to selectively connect the resistive load between the input and the output of the electromagnetic generator; and
wherein upon depletion of the power source beyond a threshold level, the controller ceases to operate and the resistive load remains connected between the input and the output of the electromagnetic generator to restrict rotation of the at least one of the plurality of wheels.

14. A method of securing a shopping cart, comprising:
providing a shopping cart, the shopping cart including (i) a shopping cart body, (ii) a plurality of wheels supporting the shopping cart body, (iii) a Wi-Fi receiver, and (iv) an electromagnetic generator operatively coupled to at least one of the plurality of wheels;
detecting a position of the shopping cart relative to a range of a network; and
controlling a switch to selectively connect and disconnect a resistive load between an input and an output of the electromagnetic generator as the position of the shopping cart detected by the Wi-Fi receiver varies between within the range of the network, and outside of the range of the network;
wherein rotation of the at least one of the plurality of wheels is restricted in response to controlling the switch to connect the resistive load between the input and the output of the electromagnetic generator when the position of the shopping cart is detected by the Wi-Fi receiver to be outside of the range of the network; and wherein the at least one of the plurality of wheels is configured to freely rotate in response to controlling the switch to disconnect the resistive load from one of the input or the output of the electromagnetic generator when the position of the shopping cart is detected by the Wi-Fi receiver to be within the range of the network.

15. The method of claim 14, wherein the shopping cart comprises a global positioning system receiver, and wherein the method comprises detecting the position of the shopping cart relative to an area defined by a geo-fence with the global positioning system receiver.

16. The method of claim 15, wherein the switch is controlled to disconnect the resistive load from the input or the output of the electromagnetic generator when the Wi-Fi receiver detects the position of the shopping cart to be within the range of the Wi-Fi network or when the global positioning system receiver detects the position of the shopping cart to be within the area defined by the geo-fence.

17. The method of claim 15, wherein the switch is controlled to connect the resistive load between the input and output of the electromagnetic generator when the Wi-Fi receiver detects the position of the shopping cart to be outside of the range of the Wi-Fi network or when the global positioning system receiver detects the position of the shopping cart to be outside of the area defined by the geo-fence.

18. The method of claim 14, comprising detecting a proximity of a user relative to the shopping cart with a sensor.

19. The method of claim 18, wherein the switch is controlled to disconnect the resistive load from the input or the output of the electromagnetic generator when the sensor detects the proximity of the customer within a predetermined distance relative to the shopping cart.

20. A shopping cart security system, comprising:
a signal source;
a shopping cart including (i) a shopping cart body, (ii) a plurality of wheels supporting the shopping cart body, (iii) an electromagnetic generator operatively coupled to at least one of the wheels, (iv) and a Wi-Fi receiver configured to receive signals from the signal source; and
a resistive load selectively connected between an input and an output of the electromagnetic generator to restrict rotation of the at least one of the plurality of wheel and selectively disconnected from the input or the output of the electromagnetic generator to allow the at least one of the plurality of wheels to rotate freely;
wherein the resistive load is disconnected from the input or the output of the electromagnetic generator when the Wi-Fi receiver detects the signal source, indicating that a position of the shopping cart is within a range of a network; and
wherein the resistive load is connected between the input and output of the electromagnetic generator when the Wi-Fi receiver fails to detect the signal source, indicating that the position of the shopping cart is outside of the range of the network.

* * * * *